(12) United States Patent
Uchida

(10) Patent No.: US 12,105,018 B2
(45) Date of Patent: Oct. 1, 2024

(54) METHOD FOR MEASURING OPTICAL CONSTANTS OF THIN FILM OF FLUORINE-CONTAINING ORGANOSILICON COMPOUND

(71) Applicant: Shin-Etsu Chemical Co., Ltd., Tokyo (JP)

(72) Inventor: Takashi Uchida, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 279 days.

(21) Appl. No.: 17/632,035

(22) PCT Filed: Jul. 30, 2020

(86) PCT No.: PCT/JP2020/029192
§ 371 (c)(1),
(2) Date: Feb. 1, 2022

(87) PCT Pub. No.: WO2021/024895
PCT Pub. Date: Feb. 11, 2021

(65) Prior Publication Data
US 2022/0276151 A1     Sep. 1, 2022

(30) Foreign Application Priority Data

Aug. 8, 2019   (JP) .................................. 2019-145856

(51) Int. Cl.
*G01N 21/21*      (2006.01)
*C08G 65/336*     (2006.01)
(Continued)

(52) U.S. Cl.
CPC ......... *G01N 21/211* (2013.01); *C08G 65/336* (2013.01); *G01B 21/08* (2013.01);
(Continued)

(58) Field of Classification Search
CPC ................. G01N 21/211; G01N 21/41; G01N 2021/213; G01N 2021/4126;
(Continued)

(56) References Cited

U.S. PATENT DOCUMENTS 5,802,233 A * 9/1998 Sugi ........................ G02B 1/04
                                                       252/514
6,349,594 B1 * 2/2002 Yabe ...................... G01B 21/08
                                                       977/852
(Continued)

FOREIGN PATENT DOCUMENTS

JP        2007-62101 A      3/2007
JP        2013-174668 A     9/2013
(Continued)

OTHER PUBLICATIONS

Extended European Search Report issued on Apr. 12, 2023 in European Patent Application No. 20850692.3, 5 pages.
(Continued)

*Primary Examiner* — Roy M Punnoose
(74) *Attorney, Agent, or Firm* — Oblon, McClelland, Maier & Neustadt, L.L.P.

(57) ABSTRACT

Provided is a method capable of precisely, reproducibly and directly measuring, by an ellipsometry method, optical constants (refractive index n, extinction coefficient κ) of a fluorine-containing organosilicon compound thin film having a homogeneous surface with a small surface roughness and haze value. The method for measuring the optical constants of the thin film of the fluorine-containing organosilicon compound, includes:
  a step of forming the thin film of the fluorine-containing organosilicon compound on a base material, the thin film having, as surface roughnesses, an arithmetic mean roughness of smaller than 1.0 nm and a root mean
(Continued)

square roughness of smaller than 2.0 nm, a haze value of smaller than 0.3 and a film thickness of 3 to 10 nm; and a step of measuring the optical constants of the thin film formed on the base material by the ellipsometry method.

5 Claims, 4 Drawing Sheets

(51) Int. Cl.
  *G01B 21/08* (2006.01)
  *G01J 4/04* (2006.01)
  *G01N 21/41* (2006.01)
  *G01Q 60/24* (2010.01)
(52) U.S. Cl.
  CPC .............. *G01J 4/04* (2013.01); *G01N 21/41* (2013.01); *G01Q 60/24* (2013.01)
(58) Field of Classification Search
  CPC ....... G01N 2021/8427; G01N 21/8422; C08G 65/336; C08G 65/007; G01B 21/08; G01B 11/30; G01J 4/04; G01Q 60/24; C09D 171/00; G02B 1/111; G02B 1/18
  See application file for complete search history.

(56) References Cited

U.S. PATENT DOCUMENTS

| | | | |
|---|---|---|---|
| 10,093,773 B2 | 10/2018 | Sakoh et al. | |
| 10,196,483 B2 | 2/2019 | Sakoh et al. | |
| 10,563,070 B2 | 2/2020 | Mitsuhashi et al. | |
| 11,001,670 B2 | 5/2021 | Sakoh et al. | |
| 2008/0284320 A1 | 11/2008 | Karkkainen | |
| 2009/0035878 A1* | 2/2009 | Sasaki | H01L 22/26 118/712 |
| 2014/0072798 A1* | 3/2014 | Naganawa | C23C 14/48 427/527 |
| 2015/0030761 A1 | 1/2015 | Kato et al. | |
| 2015/0234209 A1 | 8/2015 | Miyamoto et al. | |
| 2018/0136367 A1* | 5/2018 | Fujii | G02B 1/11 |

FOREIGN PATENT DOCUMENTS

| | | |
|---|---|---|
| JP | 5761305 B2 | 8/2015 |
| JP | 2016-210854 A | 12/2016 |
| JP | 2018-83748 A | 5/2018 |
| JP | 6451279 B2 | 1/2019 |
| WO | WO 2014/069250 A1 | 5/2014 |
| WO | WO 2016/068112 A1 | 5/2016 |
| WO | WO 2017/212850 A1 | 12/2017 |
| WO | WO 2019/073946 A1 | 4/2019 |

OTHER PUBLICATIONS

International Search Report mailed on Sep. 29, 2020 in PCT/JP2020/029192 filed on Jul. 30, 2020, (3 pages).

Marler, "On the Relationship between Refractive Index and Density for $SiO_2$-polymorphs", Physics and Chemistry of Minerals, 1988, vol. 16, pp. 286-290.

Toney et al., "Thickness Measurements of Thin Perfluoropolyether Polymer Films on Silicon and Amorphous-Hydrogenated Carbon with X-Ray Reflectivity, ESCA and Optical Ellipsometry", Journal of Colloid and Interface Science, 2000, vol. 225, pp. 219-226.

* cited by examiner

US 12,105,018 B2

METHOD FOR MEASURING OPTICAL CONSTANTS OF THIN FILM OF FLUORINE-CONTAINING ORGANOSILICON COMPOUND

TECHNICAL FIELD

The present invention relates to a method for measuring optical constants of a thin film of a fluorine-containing organosilicon compound.

BACKGROUND ART

The fluorine-containing organosilicon compound composing the thin film as a target of the optical constant measurement method of the present invention is a hydrolyzable fluorine-containing organosilicon compound usually having, in each molecule, a repetitive structure of perfluorooxyalkylene units (perfluoropolyether structure), and at least two hydrolyzable silyl groups or the like such as alkoxysilyl groups; and is disclosed in, for example, Patent documents 1 to 4. These hydrolyzable fluorine-containing organosilicon compounds are used in a way such that they are applied to the surfaces of base materials such as metals, porcelain and glass to be cured so as to then form a water and oil repellent layer (antifouling coating thin film layer) on the surfaces of these base materials, thereby imparting to the base materials a function for avoiding oil and fat stains, fingerprint stains as well as other types of stains. In recent days, this type of compound is used for antifouling purpose on antireflective films of in-vehicle lenses, in-vehicle displays and displays for mobile electronic device terminals.

In general, optical constants (refractive index n, extinction coefficient κ) of an inorganic material (particularly, an optical material such as glass and other metal oxides) are measured using a bulk sample, where the optical constants are measured based on measured values of a spectral transmittance and spectral reflectivity of the bulk sample; and as for refractive index alone, a bulk sample molded and processed into a particular shape is used, and the measurement is carried out by, for example, a minimum deviation angle method, a critical angle method (with Abbe's refractometer) or a V-block method.

Meanwhile, in the case of a bulk sample capable of forming a flat surface, an ellipsometry method is also used to measure optical constants. Further, if the sample is a thin film, the ellipsometry method can also be utilized to measure the film thickness of such thin film.

However, it is known that the optical constants of a thin film sample are different from the optical constants of a bulk sample obtained from a material composing the thin film sample. While there are various reasons for that, one of them may, for the example, be the fact that a bulk sample differs from a thin film sample in density and porosity.

For example, in the case of silicon dioxide ($SiO_2$), a correlation between density and refractive index is particularly well known. According to Non-patent document 1, the refractive index is significantly sensitive to the density.

Conventionally, optical constants of a hydrolyzable fluorine-containing organosilicon compound are measured using a solution prepared by dissolving the compound into a fluorine-based solvent, where the optical constants are then indirectly measured based on measured values of a spectral transmittance and spectral reflectivity of such solution. Further, as for the refractive index of a hydrolyzable fluorine-containing organosilicon compound alone, the measurement is conventionally performed on a liquid sample (bulk sample) by, for example, a minimum deviation angle method, a critical angle method (with Abbe's refractometer) or a V-block method.

However, there has never been disclosed a method for directly measuring optical constants of a thin film formed of any of these hydrolyzable fluorine-containing organosilicon compounds.

PRIOR ART DOCUMENTS

Patent Documents

Patent document 1: JP-A-2016-210854
Patent document 2: WO2017/212850
Patent document 3: Japanese Patent No. 5761305
Patent document 4: Japanese Patent No. 6451279

Non-Patent Documents

Non-patent document 1: Phys. Chem. Minerals, 16, 286-290 (1988)

SUMMARY OF THE INVENTION

Problems to be Solved by the Invention

Thus, the purpose of the present invention is to directly measure, by ellipsometry, optical constants (refractive index n, extinction coefficient κ) of a thin film sample of a fluorine-containing organosilicon compound, particularly a hydrolyzable fluorine-containing organosilicon compound, so that it will be possible to precisely and reproducibly measure the optical constants (refractive index n, extinction coefficient κ) of a fluorine-containing organosilicon compound thin film considered as exhibiting values of optical constants that are different from those of a bulk sample or a solution sample due to a difference in density and porosity.

Means to Solve the Problems

The inventor of the present invention diligently conducted a series of studies to achieve the above purpose, and completed the invention as follows. That is, the inventor found that by utilizing an ellipsometry method to perform a measurement on a fluorine-containing organosilicon compound thin film that is formed on a base material, and has a flat and homogeneous surface as well as a thickness of 3 to 10 nm, the optical constants of the fluorine-containing organosilicon compound thin film can be precisely, reproducibly and directly measured.

That is, the present invention is to provide the following method for measuring optical constants of a thin film of a fluorine-containing organosilicon compound.

[1]
A method for measuring optical constants of a thin film of a fluorine-containing organosilicon compound, comprising:
a step of forming the thin film of the fluorine-containing organosilicon compound on a base material, the thin film having, as surface roughnesses, an arithmetic mean roughness of smaller than 1.0 nm and a root mean square roughness of smaller than 2.0 nm, a haze value of smaller than 0.3 and a film thickness of 3 to 10 nm; and
a step of measuring the optical constants of the thin film formed on the base material by an ellipsometry method.

[2]

The method for measuring the optical constants of the thin film of the fluorine-containing organosilicon compound according to [1], wherein the step of measuring the optical constants of the thin film formed on the base material by the ellipsometry method is a step where a value of a phase angle Δ of an elliptically polarized light with regard to the thin film and a value of a tangent ψ obtained from an amplitude intensity ratio of the elliptically polarized light are measured, followed by identifying the optical constants of the thin film based on the Δ value and ψ value measured.

[3]

The method for measuring the optical constants of the thin film of the fluorine-containing organosilicon compound according to [1] or [2], wherein the optical constants are a refractive index (n) and/or an extinction coefficient (κ).

[4]

The method for measuring the optical constants of the thin film of the fluorine-containing organosilicon compound according to any one of [1] to [3], wherein the base material is selected from a silicon single crystal base material, a glass base material, and a silicon single crystal base material coated with a silicon dioxide film.

[5]

The method for measuring the optical constants of the thin film of the fluorine-containing organosilicon compound according to any one of [1] to [4], wherein the film thickness of the thin film of the fluorine-containing organosilicon compound is measured by an atom force microscope or a stylus type step profiler.

[6]

The method for measuring the optical constants of the thin film of the fluorine-containing organosilicon compound according to any one of [1] to [5], wherein the surface roughnesses of the thin film of the fluorine-containing organosilicon compound are measured by a method in accordance with JIS B0601:2013.

[7]

The method for measuring the optical constants of the thin film of the fluorine-containing organosilicon compound according to any one of [1] to [6], wherein the haze value of the thin film of the fluorine-containing organosilicon compound is measured by a method in accordance with JIS K7136:2000.

Effects of the Invention

According to the present invention, the method of the invention is capable of directly and precisely measuring, by an ellipsometry method, optical constants of a fluorine-containing organosilicon compound thin film having a homogeneous surface with a small surface roughness and haze value, and is capable of reproducibly measuring optical constants (refractive index n, extinction coefficient κ) of a fluorine-containing organosilicon compound thin film originally considered as exhibiting values of optical constants that are different from those of a bulk sample or a solution sample owing to a difference in density and porosity.

MODE FOR CARRYING OUT THE INVENTION

Figure 1:
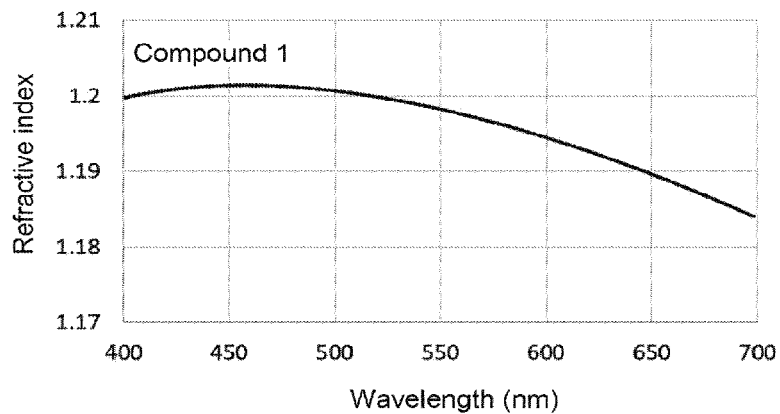
FIG. 1 is a graph showing a wavelength dispersion for a measured refractive index of a thin film of a compound 1 in a reference example 1.

The method of the present invention for measuring optical constants has a step of forming a thin film of a fluorine-containing organosilicon compound on a base material, the thin film having, as surface roughnesses, an arithmetic mean roughness of smaller than 1.0 nm and a root mean square roughness of smaller than 2.0 nm, a haze value of smaller than 0.3 and a film thickness of 3 to 10 nm; and a step of measuring optical constants of the thin film formed on the base material by an ellipsometry method.

In the beginning, in the first step, the thin film of the fluorine-containing organosilicon compound is formed, and a homogeneity of the thin film of the fluorine-containing organosilicon compound is to be confirmed. Specifically, the homogeneity of the thin film of the fluorine-containing organosilicon compound is confirmed by measuring the surface roughness, film thickness and haze value.

Formation of Thin Film of Fluorine-Containing Organosilicon Compound

The thin film of the fluorine-containing organosilicon compound is obtained by applying a coating liquid to the surface of a flat base material by means of, for example, spray coating, ink-jet coating, spin coating, dip coating or vacuum deposition coating, the coating liquid containing a fluorine-containing organosilicon compound disclosed in, for example, any of the Patent documents 1 to 4, particularly a hydrolyzable fluorine-containing organosilicon compound having, in each molecule, a repetitive structure of perfluorooxyalkylene units (perfluoropolyether structure), and at least two hydrolyzable silyl groups or the like such as alkoxysilyl groups. It is preferred that the arithmetic mean roughness of the surface of the base material be smaller than 1.0 nm, and that the root mean square roughness thereof be smaller than 2.0 nm; the material of the base material may be a silicon single crystal, a glass or a silicon single crystal surface-treated with $SiO_2$, (base material with a $SiO_2$ film previously formed thereon by, for example, deposition, sputtering, CVD or a thermal oxidation treatment).

A solvent used in the coating liquid may, for example, be a fluorine-modified aliphatic hydrocarbon-based solvent (e.g. perfluoroheptane, perfluorooctane); a fluorine-modified aromatic hydrocarbon-based solvent (e.g. 1,3-bis(trifluoromethyl)benzene); a fluorine-modified ether-based solvent (e.g. methylperfluorobutylether, ethylperfluorobutylether, perfluoro(2-butyltetrahydrofuran)); a fluorine-modified alkylamine-based solvent (e.g. perfluorotributylamine, perfluorotripentylamine); a hydrocarbon-based solvent (e.g. petroleum benzine, toluene, xylene); or a ketone-based solvent (e.g. acetone, methylethylketone, methylisobutylketone). Among these solvents, a fluorine-modified solvent is desired in terms of solubility and wettability; particularly preferred are 1,3-bis(trifluoromethyl)benzene, perfluoro(2-butyltetrahydrofuran), perfluorotributylamine and ethylperfluorobutylether.

Any two or more kinds of these solvents may be mixed together, and it is preferred that the hydrolyzable fluorine-containing organosilicon compound be uniformly dissolved therein. Here, an optimum concentration of the hydrolyzable fluorine-containing organosilicon compound to be dissolved in the solvent varies depending on a treating method; the compound may simply be in an easily weighable amount. If employing spray coating, ink-jet coating, spin coating or dip coating, it is preferred that the hydrolyzable fluorine-containing organosilicon compound be in an amount of 0.01 to 10 parts by mass, particularly preferably 0.05 to 5 parts by mass, per 100 parts by mass of a sum total of the solvent and the hydrolyzable fluorine-containing organosilicon compound; if employing vacuum deposition coating, it is preferred that the hydrolyzable fluorine-containing organosilicon compound be in an amount of 1 to 100 parts by mass, particularly preferably 3 to 30 parts by mass, per 100 parts by mass of the sum total of the solvent and the hydrolyzable fluorine-containing organosilicon compound.

When left under an environmental atmosphere for a given period of time, the fluorine-containing organosilicon compound applied to (formed as a film on) the surface of the base material will favorably adhere to the base material as a result of being cured by hydrolytic condensation owing to the moisture (water) in the atmosphere. As a condition(s) for leaving the fluorine-containing organosilicon compound and the base material, they may, for example, be left under an atmosphere having a temperature of 25° C. and a relative humidity of 50% for 12 hours, or at 150° C. for an hour.

Confirmation of Homogeneity of Thin Film of Fluorine-Containing Organosilicon Compound
(Measurement of Film Thickness)

Using an atom force microscope or a stylus type step profiler, and by establishing a thin film-uncoated portion via a masking treatment or the like, the film thickness of the thin film of the fluorine-containing organosilicon compound can be measured based on a difference in height between the thin film-uncoated portion and a thin film-coated portion.

Further, the film thickness of the thin film of the fluorine-containing organosilicon compound can also be measured by fluorescent X-ray measurement. In such case, it is necessary to draw, in advance, a calibration curve showing a correlation between the film thickness obtained using the atom force microscope or stylus type step profiler and a fluorescent X-ray intensity derived from elemental fluorine.

(Measurement of Surface Roughness)

With a method according to JIS B0601:2013, the surface roughness is measured by measuring the arithmetic mean roughness and root mean square roughness of the surface of the thin film of the fluorine-containing organosilicon compound, using an atom force microscope or an optical three-dimensional shape measurement device (e.g. confocal laser microscope and laser interferometer).

(Measurement of Haze Value)

With a method according to JIS K7136:2000, the haze value is measured by measuring a haze value of the base material on which the thin film of the fluorine-containing organosilicon compound has been formed (applied thereto and cured thereon), using a hazemeter.

As a result of measuring the film thickness, surface roughness and haze value of the thin film by the aforementioned methods, if each value is within the range(s) shown below, it is then regarded that a homogeneity of the thin film has been confirmed, followed by carrying out a step of measuring optical constants of the thin film by an ellipsometry method.

(Range of Film Thickness)

The film thickness of the thin film of the fluorine-containing organosilicon compound is 3 to 10 nm, preferably 4 to 9 nm, more preferably 5 to 8 nm. If the thin film is thicker than 10 nm, a portion beyond 10 nm in thickness (an excess portion) will be removed by the following procedure.

(Method for Adjusting Film Thickness)

The excess portion of the thin film of the fluorine-containing organosilicon compound can be removed by either wiping it off with a commercially available tissue paper, or pouring and running a fluorine solvent thereon. After the removal of the excess portion, the film thickness is then confirmed by the above film thickness measurement method, and the removal process is to be repeated until an appropriate film thickness has been achieved.

(Range of Surface Roughness)

As for the surface roughness of the thin film of the fluorine-containing organosilicon compound, it is preferred that the arithmetic mean roughness is smaller than 1.0 nm (not smaller than 0 nm, but smaller than 1.0 nm), and the root mean square roughness is smaller than 2.0 nm (not smaller than 0 nm, but smaller than 2.0 nm); more preferably the arithmetic mean roughness is smaller than 0.5 nm (not smaller than 0 nm, but smaller than 0.5 nm), and the root mean square roughness is smaller than 1.0 nm (not smaller than 0 nm, but smaller than 1.0 nm); even more preferably the arithmetic mean roughness is 0 to 0.35 nm, and the root mean square roughness is 0 to 0.5 nm.

(Range of Haze Value)

It is preferred that the haze value of the thin film of the fluorine-containing organosilicon compound be smaller than 0.3 (not smaller than 0, but smaller than 0.3), more preferably not larger than 0.25 (0 to 0.25).

(Method for Adjusting Surface Roughness and Haze Value)

When the surface roughness and haze value of the thin film of the fluorine-containing organosilicon compound are out of the preferable ranges in the present invention, the surface roughness and haze value are to be adjusted by a method identical to the method for adjusting the film thickness.

Measurement of Phase Angle, Tangent Value and Optical Constants by Ellipsometry Method An ellipsometry method is to allow a polarized light to enter a sample with a flat surface, and then measure changes in a polarization state of a reflected light, thereby making it possible to measure optical constants (refractive index n, extinction coefficient κ) of the sample as well as the film thickness thereof if the sample is a thin film.

In the ellipsometry method employed in the method for measuring the optical constants of the thin film of the fluorine-containing organosilicon compound of the present invention, a linear polarized light is allowed to enter the thin film formed on the base material, followed by measuring a value of a phase angle Δ of an elliptically polarized light reflected and a value of a tangent ψ obtained from an amplitude intensity ratio of the elliptically polarized light. Here, if the film thickness of the thin film as well as the optical constants and thickness of the base material are known, the optical constants of the thin film (refractive index n, extinction coefficient κ) can be identified based on a correlation between these known values and the values of Δ and ψ measured. This measurement is carried out by an ellipsometer.

WORKING EXAMPLES

The present invention is described in detail hereunder with reference to working and comparative examples; the present invention shall not be limited to the following working examples.

Reference Example 1

(Preparation of Coating Liquid)
A compound 1 represented by the following formula was dissolved into a fluorine solvent (NOVEC7200 by 3M Company) so that a weight concentration would be 20%, thus obtaining a coating liquid.

[Chemical formula 1]

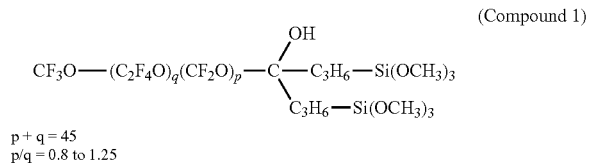

(Compound 1)

p + q = 45
p/q = 0.8 to 1.25

(Application of Coating Liquid)
A glass base material on which a SiO$_2$ film having a thickness of 10 nm had been formed was placed into a resistance heating-type vacuum deposition device (VTR-350M by ULVAC KTKO, Inc.), followed by delivering 4 μL of the coating liquid by drops onto a resistance heating part, and reducing the pressure. Resistance heating was started once the pressure inside the container was reduced to 3×10$^{-3}$ Pa or lower. An electric power consumed for resistance heating was adjusted so that a maximum evaporation rate at a quartz crystal film thickness meter installed in a location about 20 cm away from the resistance heating part would be 1.0 nm/sec. After the evaporation rate at the quartz crystal film thickness meter had decreased to 0.1 nm/sec, resistance heating was continued for 100 sec. In order to cool the device, the device was left to stand for 5 min, followed by opening the device to the atmosphere so as to obtain a base material having a coating film of the compound 1.
(Curing of Coating Film)
The base material having the coating film of the compound 1 was left under an environment of 25° C., relative humidity 50% for not less than 12 hours, whereby the coating film was cured, and the thin film of the compound 1 was thus obtained.

Figure 2:
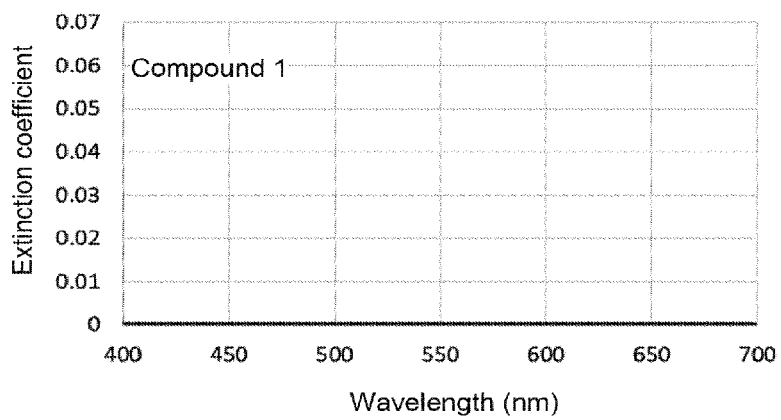
FIG. 2 is a graph showing a wavelength dispersion for a measured extinction coefficient of the thin film of the compound 1 in the reference example 1.

(Measurement of Film Thickness)
An atom force microscope (Nanocute by Hitachi High-Tech Corporation) was used to measure a surface topography image of a 500 nm squared region, thereby obtaining the film thickness of the thin film of the compound 1.
(Measurement of Surface Roughness)
A three-dimensional shape measurement microscope (LEXT OLS4100 by Olympus Corporation) was used to observe the surface shape of the thin film of the compound 1 with the aid of an objective lens at 50-fold magnification, thereby obtaining the surface roughness of the compound 1. If any of the arithmetic mean roughness or root mean square roughness was not larger than 2.0 nm, the surface roughness was then obtained from a surface topography image of an atom force microscope.
(Measurement of Haze Value)
A hazemeter (NDH5000 by NIPPON DENSHOKU INDUSTRIES CO., LTD.) was used to measure the haze value of the thin film of the compound 1.
(Measurement of Optical Constants of Base Material Plate Having Thin Film by Ellipsometer)
An ellipsometer (M-2000D by J.A. Woollam Co., Inc.) was used to measure a phase angle Δ and a tangent ψ an incidence angle of 57° to 59°. The data measured were then fitted into curves to obtain a wavelength dispersion for each optical constant. As for the film thickness, the value obtained by the above method was used. FIG. 1 and FIG. 2 are respectively a graph showing a wavelength dispersion for the measured refractive index of the thin film of the compound 1 in the reference example 1; and a graph showing a wavelength dispersion for the measured extinction coefficient of the thin film of the compound 1 in the reference example 1.

Reference Example 2

Figure 3:
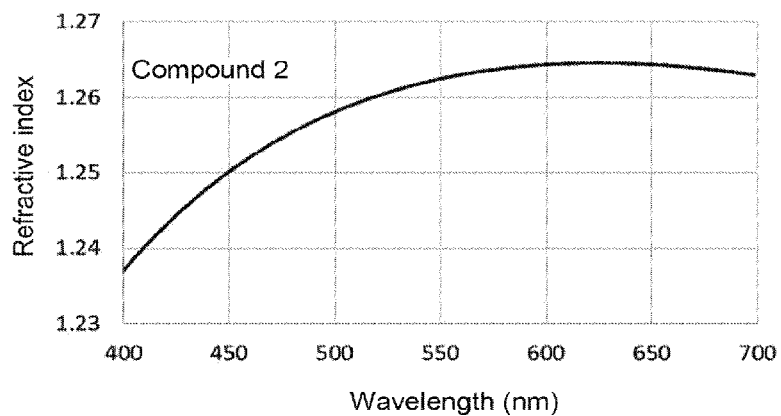
FIG. 3 is a graph showing a wavelength dispersion for a measured refractive index of a thin film of a compound 2 in a reference example 2.
Figure 4:
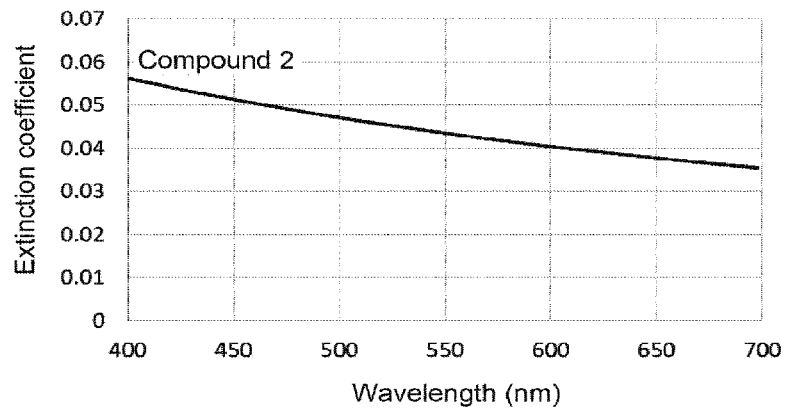
FIG. 4 is a graph showing a wavelength dispersion for a measured extinction coefficient of the thin film of the compound 2 in the reference example 2.

The optical constants were measured by a method similar to the one employed in the reference example 1, except that the compound 1 was substituted with a compound 2 represented by the following formula. FIG. 3 and FIG. 4 are respectively a graph showing a wavelength dispersion for a measured refractive index of a thin film of the compound 2 in the reference example 2; and a graph showing a wavelength dispersion for a measured extinction coefficient of the thin film of the compound 2 in the reference example 2.

[Chemical formula 2]

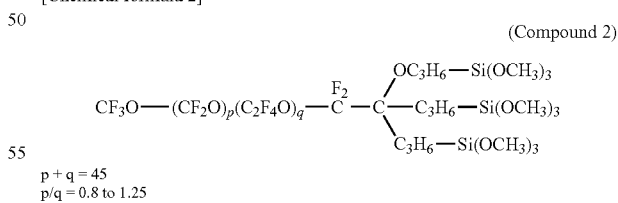

(Compound 2)

p + q = 45
p/q = 0.8 to 1.25

Reference Example 3

Figure 5:
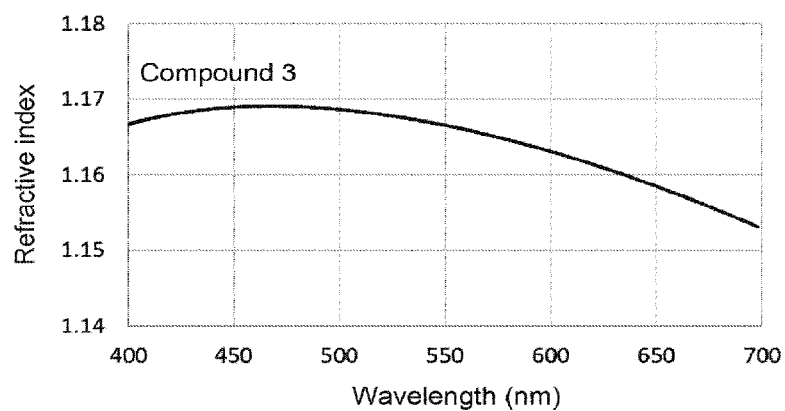
FIG. 5 is a graph showing a wavelength dispersion for a measured refractive index of a thin film of a compound 3 in a reference example 3.
Figure 6:
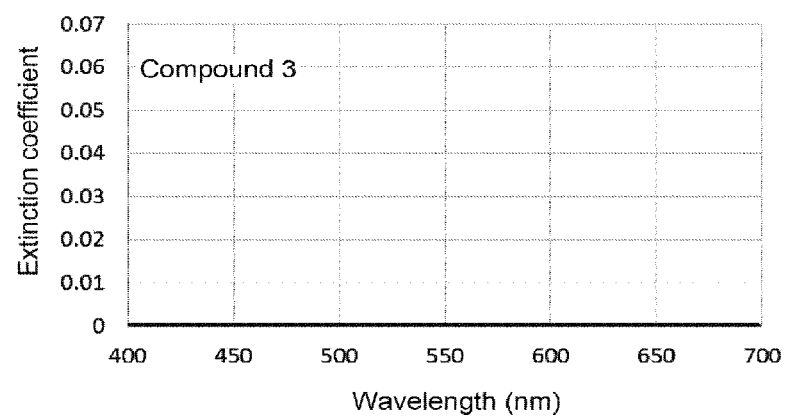
FIG. 6 is a graph showing a wavelength dispersion for a measured extinction coefficient of the thin film of the compound 3 in the reference example 3.

The optical constants were measured by a method similar to the one employed in the reference example 1, except that the compound 1 was substituted with a compound 3. FIG. 5 and FIG. 6 are respectively a graph showing a wavelength dispersion for a measured refractive index of a thin film of the compound 3 in the reference example 3; and a graph showing a wavelength dispersion for a measured extinction coefficient of the thin film of the compound 3 in the reference example 3.

[Chemical formula 3]

(Compound 3)

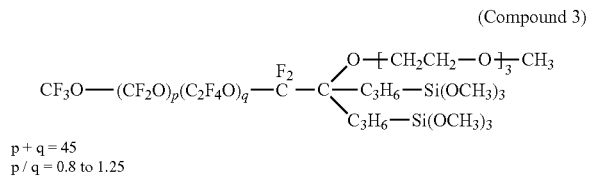

$p + q = 45$
$p / q = 0.8 \text{ to } 1.25$

Working Example 1

Figure 7:
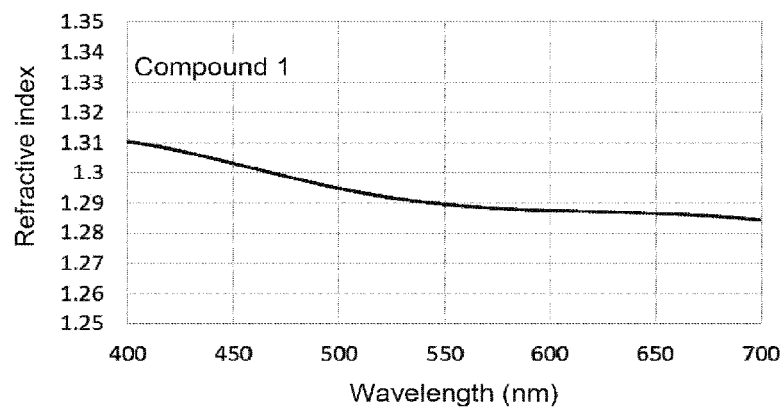
FIG. 7 is a graph showing a wavelength dispersion for a measured refractive index of an adjusted thin film of the compound 1 in a working example 1.
Figure 8:
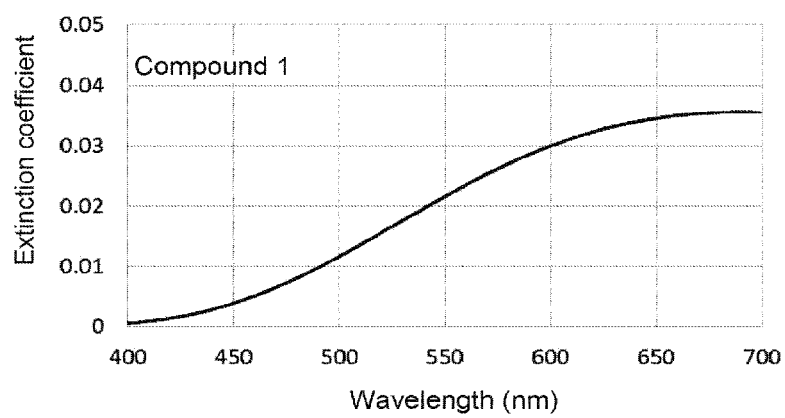
FIG. 8 is a graph showing a wavelength dispersion for a measured extinction coefficient of the adjusted thin film of the compound 1 in the working example 1.

The optical constants were measured by a method similar to the one employed in the reference example 1, except that in order to adjust the film thickness, surface roughness and haze value, the film thickness, surface roughness and haze value of the coating film were adjusted by dry wiping the surface of the coating film with a tissue paper after the coating film had cured (100 times back and forth with the tissue paper being pressed against the surface of the coating film at a load of 500 g/cm² to 1,000 g/cm²) (working example 1). FIG. 7 and FIG. 8 are respectively a graph showing a wavelength dispersion for a measured refractive index of an adjusted thin film of the compound 1 in the working example 1; and a graph showing a wavelength dispersion for a measured extinction coefficient of an adjusted thin film of the compound 1 in the working example 1.

Working Example 2

Figure 9:
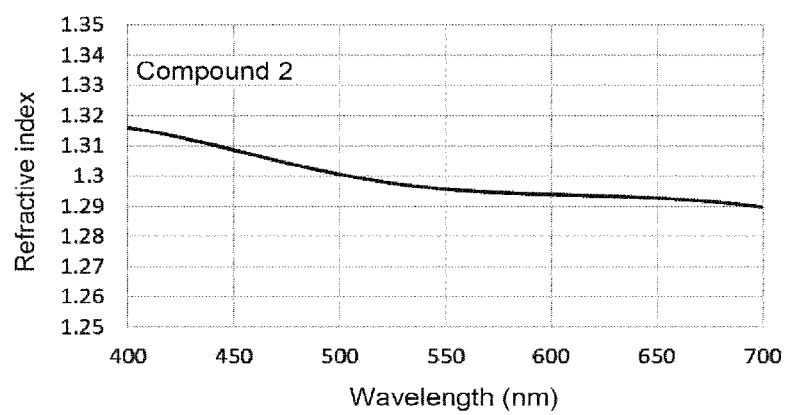
FIG. 9 is a graph showing a wavelength dispersion for a measured refractive index of an adjusted thin film of the compound 2 in a working example 2.
Figure 10:
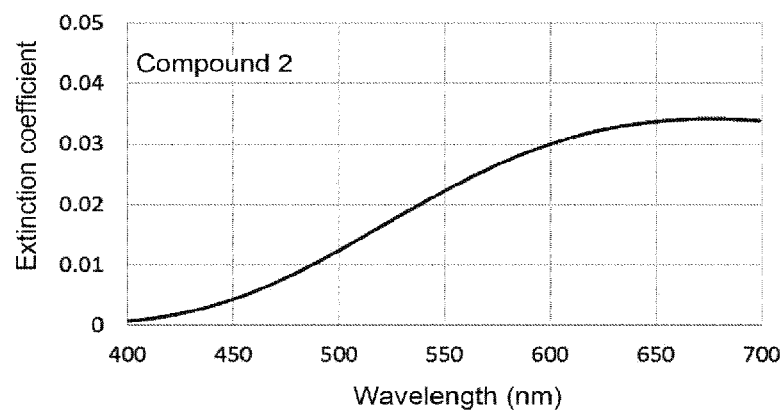
FIG. 10 is a graph showing a wavelength dispersion for a measured extinction coefficient of the adjusted thin film of the compound 2 in the working example 2.

The optical constants were measured by a method similar to the one employed in the reference example 2, except that in order to adjust the film thickness, surface roughness and haze value, the film thickness, surface roughness and haze value of the coating film were adjusted by dry wiping the surface of the coating film with a tissue paper after the coating film had cured (100 times back and forth with the tissue paper being pressed against the surface of the coating film at the load of 500 g/cm² to 1,000 g/cm²) (working example 2). FIG. 9 and FIG. 10 are respectively a graph showing a wavelength dispersion for a measured refractive index of an adjusted thin film of the compound 2 in the working example 2; and a graph showing a wavelength dispersion for a measured extinction coefficient of an adjusted thin film of the compound 2 in the working example 2.

Working Example 3

Figure 11:
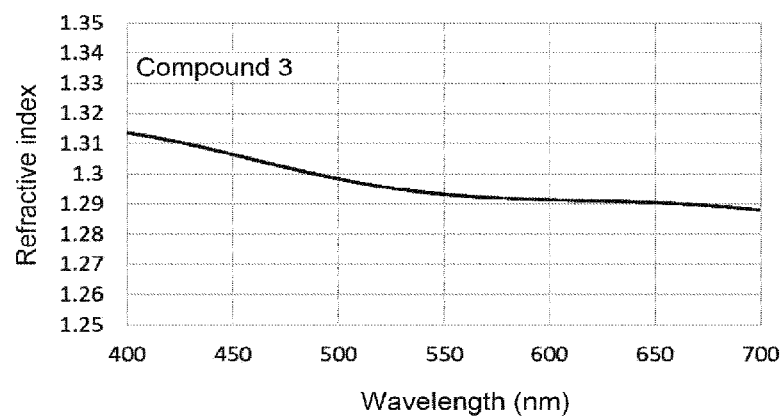
FIG. 11 is a graph showing a wavelength dispersion for a measured refractive index of an adjusted thin film of the compound 3 in a working example 3.
Figure 12:
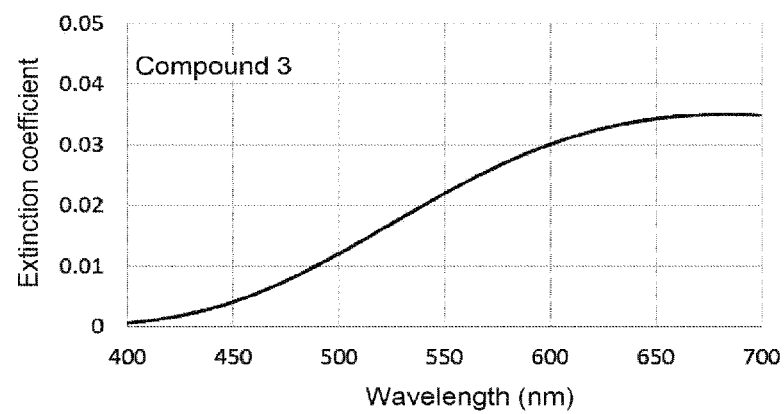
FIG. 12 is a graph showing a wavelength dispersion for a measured extinction coefficient of the adjusted thin film of the compound 3 in the working example 3.

The optical constants were measured by a method similar to the one employed in the reference example 3, except that in order to adjust the film thickness, surface roughness and haze value, the film thickness, surface roughness and haze value of the coating film were adjusted by dry wiping the surface of the coating film with a tissue paper after the coating film had cured (100 times back and forth with the tissue paper being pressed against the surface of the coating film at the load of 500 g/cm² to 1,000 g/cm²) (working example 3). FIG. 11 and FIG. 12 are respectively a graph showing a wavelength dispersion for a measured refractive index of an adjusted thin film of the compound 3 in the working example 3; and a graph showing a wavelength dispersion for a measured extinction coefficient of an adjusted thin film of the compound 3 in the working example 3.

Comparative Example 1

With regard to the compound 1 in a liquid state, an Abbe's refractometer (DR-A1 by ATAGO CO., LTD.) was used to measure a refractive index of the compound 1 (bulk) at a wavelength of 589 nm under a temperature of 25° C.

Comparative Example 2

With regard to the compound 2 in a liquid state, an Abbe's refractometer (DR-A1 by ATAGO CO., LTD.) was used to measure a refractive index of the compound 2 (bulk) at a wavelength of 589 nm under a temperature of 25° C.

Comparative Example 3

With regard to the compound 3 in a liquid state, an Abbe's refractometer (DR-A1 by ATAGO CO., LTD.) was used to measure a refractive index of the compound 3 (bulk) at a wavelength of 589 nm under a temperature of 25° C.

The above measurement results are shown in Table 1. As can be seen from the results shown in Table 1, it was confirmed that the optical constants of the thin film sample of the fluorine-containing organosilicon compound were able to be directly, precisely and reproducibly measured by the method of the present invention for measuring optical constants. Further, it was confirmed that while the refractive indexes of the (adjusted) thin film samples of the compounds 1 to 3 in the working examples 1 to 3, which were measured by the optical constant measurement method of the present invention, were well correlated with the refractive indexes of the (liquid) bulk samples of the compounds 1 to 3, the measured values of the refractive indexes of the thin film samples were slightly different from the measured values of the refractive indexes of the bulk samples.

TABLE 1

|  | Film thickness (nm) | Arithmetic mean roughness (nm) | Root mean square roughness (nm) | Haze value | Refractive index |
|---|---|---|---|---|---|
| Reference example 1 | 11.3 | 3.0 | 3.0 | 1.23 | 1.195 |
| Reference example 2 | 10.7 | 3.0 | 6.0 | 1.55 | 1.264 |
| Reference example 3 | 10.5 | 11.0 | 22.0 | 3.01 | 1.164 |
| Working example 1 | 5.2 | 0.23 | 0.30 | 0.25 | 1.288 |
| Working example 2 | 5.4 | 0.25 | 0.31 | 0.24 | 1.295 |
| Working example 3 | 5.5 | 0.25 | 0.30 | 0.24 | 1.292 |
| Comparative example 1 | — | — | — | — | 1.308 |
| Comparative example 2 | — | — | — | — | 1.311 |
| Comparative example 3 | — | — | — | — | 1.312 |

The invention claimed is:

1. A method for measuring optical constants of a thin film of a fluorine-containing organosilicon compound, comprising:

a step of forming the thin film of the fluorine-containing organosilicon compound on a base material, the thin film having, as surface roughnesses, an arithmetic mean roughness of smaller than 1.0 nm and a root mean square roughness of smaller than 2.0 nm, a haze value of smaller than 0.3 and a film thickness of 3 to 10 nm; and a step of measuring the optical constants of the thin film formed on the base material by an ellipsometry method.

2. The method for measuring the optical constants of the thin film of the fluorine-containing organosilicon compound according to claim 1, wherein the step of measuring the optical constants of the thin film formed on the base material by the ellipsometry method is a step where a value of a phase angle $\Delta$ of an elliptically polarized light with regard to the thin film and a value of a tangent $\psi$ obtained from an amplitude intensity ratio of the elliptically polarized light are measured, followed by identifying the optical constants of the thin film based on the $\Delta$ value and $\psi$ value measured.

3. The method for measuring the optical constants of the thin film of the fluorine-containing organosilicon compound according to claim 1, wherein the optical constants are a refractive index (n) and/or an extinction coefficient ($\kappa$).

4. The method for measuring the optical constants of the thin film of the fluorine-containing organosilicon compound according to claim 1, wherein the base material is selected from a silicon single crystal base material, a glass base material, and a silicon single crystal base material coated with a silicon dioxide film.

5. The method for measuring the optical constants of the thin film of the fluorine-containing organosilicon compound according to claim 1, wherein the film thickness of the thin film of the fluorine-containing organosilicon compound is measured by an atom force microscope or a stylus type step profiler.

* * * * *